(12) United States Patent
Crowley et al.

(10) Patent No.: US 12,659,659 B2
(45) Date of Patent: Jun. 16, 2026

(54) AUDIO DATA TRANSFER

(71) Applicant: Apple Inc., Cupertino, CA (US)

(72) Inventors: Patrick J. Crowley, Santa Clara, CA (US); Collin J. Richardson, Livermore, CA (US); Christopher M. Werner, San Jose, CA (US); Jason A. Granger, San Jose, CA (US); Brad G. Boozer, Campbell, CA (US); Sameer Pandya, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 312 days.

(21) Appl. No.: 18/298,350

(22) Filed: Apr. 10, 2023

(65) Prior Publication Data

US 2024/0340585 A1 Oct. 10, 2024

(51) Int. Cl.
| | |
|---|---|
| *G08B 3/10* | (2006.01) |
| *G06F 1/16* | (2006.01) |
| *H04R 3/04* | (2006.01) |

(52) U.S. Cl.
CPC .............. *H04R 3/04* (2013.01); *G06F 1/163* (2013.01); *G08B 3/10* (2013.01)

(58) Field of Classification Search
CPC .............. H04R 3/04; G06F 1/163; G08B 3/10
See application file for complete search history.

(56) References Cited

U.S. PATENT DOCUMENTS

| | | | | |
|---|---|---|---|---|
| 5,999,089 | A | * 12/1999 | Carlson | G08B 1/08 |
| | | | | 367/197 |
| 2009/0315687 | A1 * | 12/2009 | Kanevsky | H04B 11/00 |
| | | | | 340/384.4 |
| 2011/0025499 | A1 * | 2/2011 | Hoy | G08B 1/08 |
| | | | | 340/540 |
| 2011/0150240 | A1 * | 6/2011 | Akiyama | H04B 1/7075 |
| | | | | 375/150 |
| 2012/0134238 | A1 * | 5/2012 | Surprenant | H04S 1/007 |
| | | | | 367/137 |
| 2014/0253326 | A1 * | 9/2014 | Cho | H04W 4/90 |
| | | | | 340/539.11 |
| 2021/0029855 | A1 * | 1/2021 | Yoon | H05K 7/20509 |

FOREIGN PATENT DOCUMENTS

JP       2000031917 A  *  1/2000

OTHER PUBLICATIONS

Franco, Ray. "Smoke Alarm Kidde Model i4618A Teardown." electrical-forensics, 2020, www.electrical-forensics.com/SmokeAlarms/Brand/Kidde/i4618/Kidde-i4618.html. (Year: 2020).*

\* cited by examiner

*Primary Examiner* — James K Mooney

(74) *Attorney, Agent, or Firm* — Dorsey & Whitney LLP

(57) ABSTRACT

A wearable device includes a housing, a speaker, and a processor. The housing defines an internal volume and the speaker is located within the internal volume. The process is also located within the internal volume and generates a modulated acoustic signal comprising a first audio wave and a second audio wave. The speaker is configured to output the modulated acoustic signal.

20 Claims, 6 Drawing Sheets

400A

400B

400C

700

800

AUDIO DATA TRANSFER

FIELD

The described embodiments relate generally to wireless data transfer. More particularly, the present embodiments relate to wireless data transfer using one or more portable electronic devices.

BACKGROUND

Audio signals, especially those to indicate distress, are difficult to perceive and locate in some situations, such as in mountainous, densely forested, or urban environments, as well as underwater, under snow, or in rainy, windy, or snowy weather conditions. This is because these types of environments can create multiple paths for a distress signal to travel, and thus generate difficulties for search and rescue parties to identify either the nature or the location of the distress signal and the corresponding distress.

SUMMARY

In at least one example of the present disclosure, a wearable device, such as a smart watch, includes a housing defining an internal volume. The wearable device also includes a speaker, a microphone, and a processor disposed within the internal volume. The processor is connected to the speaker and the microphone and decodes an audible modulated acoustic signal received by the microphone and outputs the audible modulated acoustic signal via the speaker. The audible modulated acoustic signal includes a first audio waveform and a second audio waveform, and the speaker is configured to output the modulated acoustic signal. The first audio waveform can include a siren. The second audio waveform can include situational data in the form of a binary signal. The wearable device also includes a display assembly connected to the housing and including a touch sensitive layer to receive user input including the situational data.

In some examples, the modulated acoustic signal comprises a first modulated acoustic signal. The wearable device includes a number of microphones disposed within the interval volume to receive a second modulated acoustic signal. The wearable device includes a processor to extract situational data from the second modulated acoustic signal.

In one example of the present disclosure, an electronic audio device includes a housing, a processor, and a speaker. The housing defines an internal volume, and the processor and the speaker are disposed within the internal volume. The processor is configured to generate a signal that includes a digital data waveform and an audio signal that includes an analog waveform. The speaker is electrically coupled to the processor and is configured to output a modulation of the data signal and the audio signal. In some examples, the modulation of the audio signal and the data signal is one of a frequency modulation, amplitude modulation, phase modulation, or frequency-shift keying. In one example, the processor generates the data signal in response to a user input. In one example, the data signal is predetermined in response to an external input.

In some examples, the electronic audio device further includes a sensor electrically coupled to the processor. The sensor measures an environmental parameter of the electronic device, and the data signal is based on the environmental parameter.

In one example of the present disclosure, an electronic watch includes a microphone and a processor. The microphone is configured to receive an acoustic signal. The processor is electrically coupled to the microphone and is configured to identify a first component of the acoustic signal, extract a second component of the acoustic signal, and determine, based on the second component, encoded information. In some examples, the first component of the acoustic signal is a predetermined siren signal. In some examples, the second component of the acoustic includes global positioning system (GPS) information. The first component of the acoustic signal can include an acoustic wave. The second component of the acoustic signal can include a binary signal. In some examples, the electronic device includes a first microphone, which is the first microphone, as well as a second microphone, and/or a third microphone.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
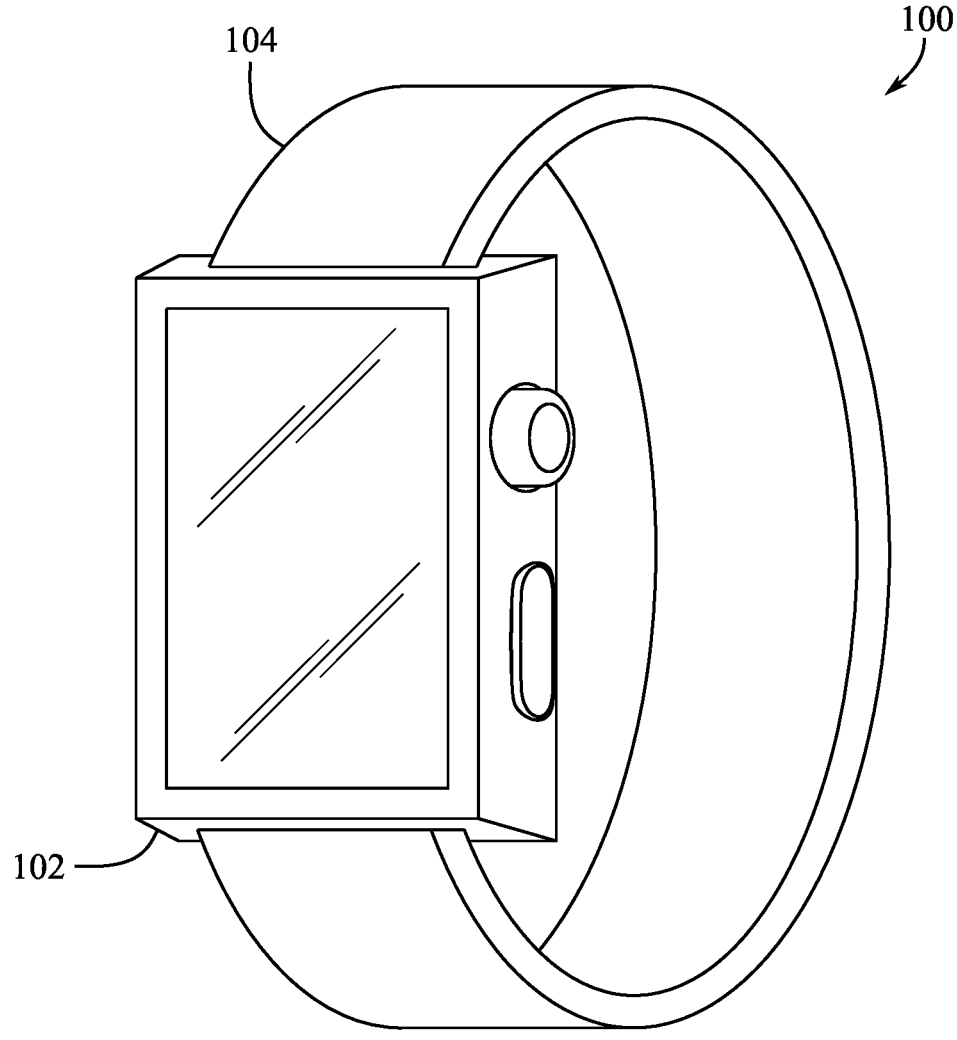
FIG. 1 illustrates an electronic device, according to one example.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The present disclosure relates generally to wireless data transfer. More particularly, the present disclosure relates to transferring data via an audio signal generated by an electronic device. The electronic devices described herein can provide an integrated technique and method for transmitting data simultaneously through an audio signal.

An electronic device may be capable of transmitting an audio tone. In many situations, the audio tone may be generated and transmitted in response to a specific event, such as when a user of the electronic device needs to locate the electronic device or alternatively when the user is in a situation of distress. For example, the user may want to transmit a distress signal, such as siren, from their electronic device.

The audio tone may be difficult to echo locate in some environments (e.g., mountainous, forested, urban, under snow, under water, etc.). For example, mountainous areas can create multiple paths for the audio tone to be effectively received. Weather conditions can also interfere with a human's ability to effective locate a source of the audio tone. Even though the audio tone may be designed to be loud and piercing (e.g., to be audible to humans within several hundred meters), mountainous or densely forested environments may impede a third party's ability to perceive the distress signal and/or pinpoint a location of the source of the distress signal. Adverse weather conditions (e.g., snow, rain, wind, etc.) may additionally or alternatively impede the third party's ability to perceive and locate the distress signal. Furthermore, in some cases, humans may be desensitized to distress signals. Many humans live in loud urban environments, which include sounds such as police sirens, ambulance sirens, fire alarms, etc. In some cases, humans may have a hearing impairment that impedes their ability to perceive a distress signal.

The present disclosure describes devices capable of transmitting an informational acoustic signal encoding an audio wave with situational data that is receivable and decodable by a third-party electronic device. For example, a device can include a processor configured to generate an acoustic data signal and a speaker electrically coupled to the processor and configured to output the data signal. In at least one example, the device can include a microphone configured to receive an acoustic signal, a processor electrically coupled to the microphone and configured to identify a first component of the acoustic signal, extract a second component of the acoustic signal, and determine, based on the second component, encoded information. The informational acoustic signal generated by the processor, output by the speaker, and received by the microphone, allows the device, or a third-party electronic device, and thus a user of the third-party electronic device, to perceive and decode the informational acoustic signal as well locate its source. In many situations, such techniques and methods allow the distressed user to be better assisted in a more effective and timely manner. For example, emergency workers or search parties may be able act more quickly to find the distressed party. In order to generate the informational acoustic signal, an audio wave, such as a siren, can be modulated with another audio wave that includes situational data depending on the nature of the distress.

These and other embodiments are discussed below with reference to FIGS. 1-8. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates an electronic device 100, according to one example. The electronic device 100 shown in FIG. 1 may be a wearable device, such as a smartwatch or other electronic audio device. The smartwatch of FIG. 1 is merely one representative example of a device that can be used in conjunction with the systems and methods disclosed herein. The electronic device 100 can correspond to any form of a wearable electronic device, a portable media player, a media storage device, a portable digital assistant ("PDA"), a tablet computer, a computer, a mobile communication device, a global positioning system (GPS) unit, a remote control device, a smart watch, a smart phone, or other electronic device. Additionally or alternatively, the electronic device 100 can correspond to any other type of suitable electronic device. The electronic device 100 can be referred to as an electronic device, a consumer device, or a user device. In some examples, the electronic device 100 can include a housing 102 that can carry operational components, for example, within an internal volume at least partially defined by the housing 102. The electronic device 100 can also include a strap 104, or other retaining component that can secure the electronic device 100 to a body of a user, as desired. Further details of the electronic device are provided below with reference to FIGS. 2A-B and FIG. 3.

Any of the features, components, and/or parts, including the arrangements and configurations thereof shown in FIG. 1 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1.

Figures 2A, 2B:
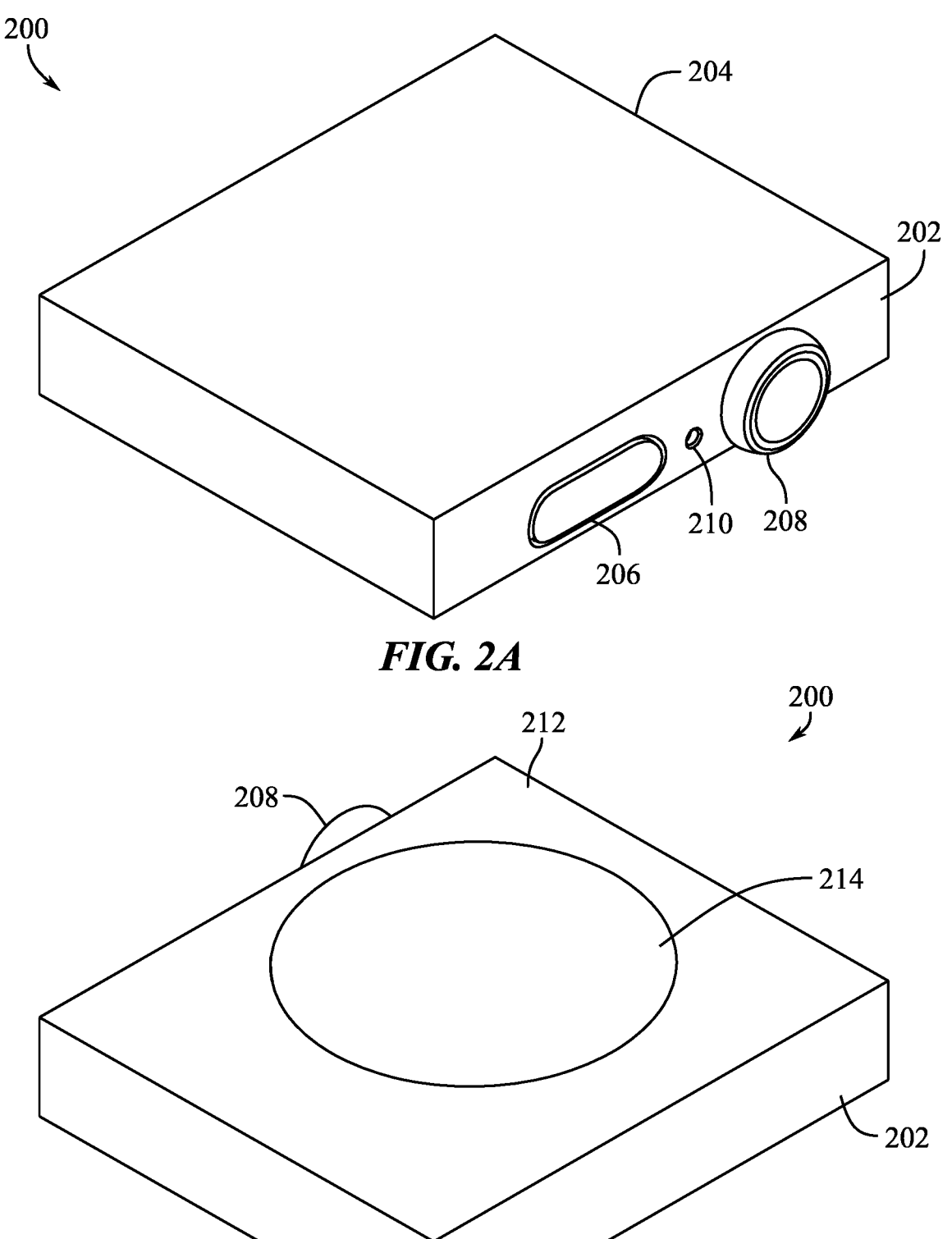
FIG. 2A illustrates an electronic device, according to one example.
FIG. 2B shows a bottom perspective view of the electronic device, according to one example.

FIG. 2A illustrates an electronic device 200, according to one example. The electronic device can be a wearable device, such as a smartwatch, or other electronic audio device that is capable of generating, transmitting, and/or receiving audio signals. The electronic device 200 can include a housing 202, and a display assembly 204 attached to the housing 202. The housing 202 can substantially define at least a portion of an exterior surface of the electronic device 200.

The display assembly 204 can include a glass, a plastic, or any other substantially transparent exterior layer, material, component, or assembly. The display assembly 204 can include multiple layers, and in some examples, each layer can provide a unique function. Accordingly, the display assembly 204 can be, or can be a part of, an interface component. The display assembly 204 can define a front exterior surface of the electronic device 200 and, as described herein, this exterior surface can be considered an interface surface. In some examples, the interface surface defined by display assembly 204 can receive inputs, such as touch inputs, from a user.

In some examples, the housing 202 can be a substantially continuous or unitary component and can define one or more openings to receive components of the electronic device 200. In some examples, the electronic device 200 can include input components such as one or more buttons 206 and/or a crown 208 that can be disposed in the openings. In some examples, a material can be disposed between the buttons 206 and/or crown 208 and the housing 202 to provide an airtight and/or watertight seal at the locations of the openings. The housing 202 can also define one or more openings or apertures, such as the aperture 210 that can allow for sound to pass into or out of the internal volume defined by the housing 202. For example, the aperture 210 can be in communication with a microphone component disposed in the internal volume.

FIG. 2B shows a bottom perspective view of the electronic device 200, according to one example. The electronic device 200 can include a back cover 212 that can be attached to the housing 202, for example, opposite the display assembly 204. The back cover 212 can include ceramic, plastic, metal, or combinations thereof. In some examples, the back cover 212 can include an at least partially electromagnetically transparent component 214. The electromagnetically transparent component 214 can be transparent to any desired wavelengths of electromagnetic radiation, such as visible light, infrared light, radio waves, or combinations thereof. In some examples, the electromagnetically transparent component 214 can allow sensors and/or emitters disposed in the housing 202 to communicate with the external environment. Together, the housing 202, display assembly 204 and back cover 212 can substantially define an internal volume and an external surface of the device 200.

Any of the features, components, and/or parts, including the arrangements and configurations thereof shown in FIGS. 2A-B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 2A-B.

Figure 3:
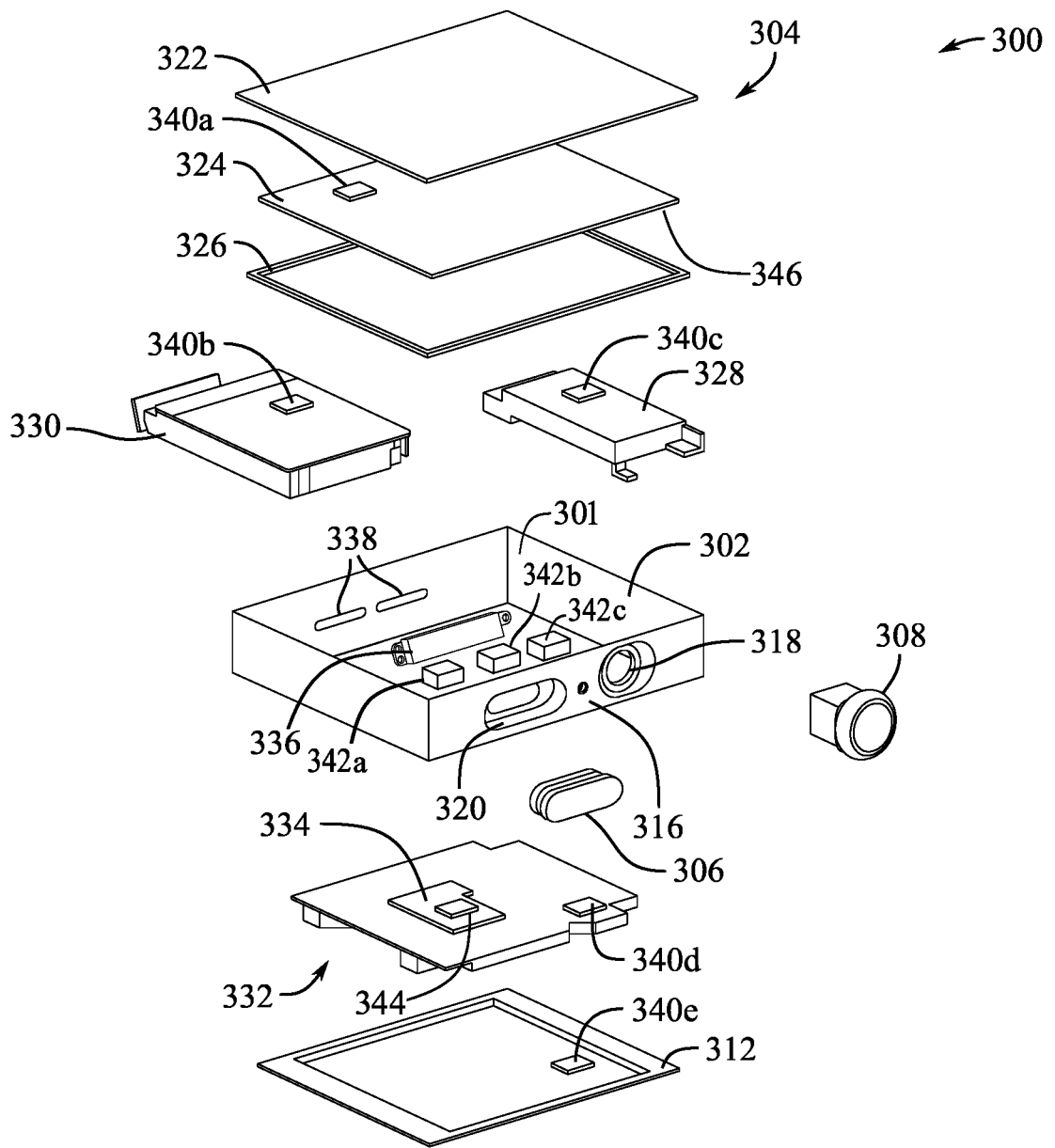
FIG. 3 illustrates an exploded view of an electronic device, according to one example.

FIG. 3 illustrates an exploded view of an electronic device 300, according to one example. The electronic device 300 can be a smartwatch substantially similar to, and can include some or all of the features of, the devices described herein, such as electronic devices 100 and 200. The electronic device 300 can include a housing 302, a display assembly 304, and a back cover 312. Together, the housing 302, display assembly 304, and back cover 312 can define an exterior surface and an internal volume 301 of the electronic device 300.

The housing 302 can be a substantially continuous or unitary component, and can define one or more openings 316, 318, 320 to receive components of the electronic device 300 and/or to provide access to an internal portion of the electronic device 300. In some examples, the electronic device 300 can include input components such as one or more buttons 306 and/or a crown 308 that can be disposed in the openings 320, 318. A microphone 342a can be disposed in the internal volume 301 in communication with the external or ambient environment through the opening 316. The electronic device 300 can include a second microphone 342b and a third microphone 342c also disposed in the internal volume 301 in communication with the external or ambient environment, either through the opening 316 or through additional openings of the housing 302. The device 300 of FIG. 3 is shown in an exploded view and it is noted that the microphones 342a-c can be disposed in the internal volume 301 when the device 300 is assembled. Although not illustrated, in some examples, the electronic device 300 can include more than three microphones 342a-c. Thus, in the following and above descriptions, the use of the singular term microphone can refer to one or more microphones where appropriate.

The display assembly 304 can be received by, and can be attached to, the housing 302. The display assembly 304 can include a cover 322 including a transparent material, such as plastic, glass, and/or ceramic. The display assembly 304 can also include a display layer 324 that can include multiple layers and components, each of which can perform one or more desired functions. For example, the display layer 324 can include a layer that can include a touch detection layer or component, a touch sensitive layer 346, a force sensitive layer or component, and one or more display layers or components that can include one or more pixels and/or light emitting portions to display visual content and/or information to a user. In some examples, the display layer or component can include a liquid crystal display (LCD), a light emitting diode (LED) display, an organic light emitting diode (OLED) display, and/or any other form of display. The display layer 324 can also include one or more electrical connectors to provide signals and/or power to the display layer from other components of the electronic device 300.

In some examples, the electronic device 300 can include a gasket or seal 326 that can be disposed between the display assembly 304 and the housing 302 to substantially define a barrier to the ingress of liquids or moisture into the internal volume 301 from the external environment at the location of the seal 326. As described herein, the seal 326 can include polymer, metal, and/or ceramic materials. The electronic device 300 can also include a similar seal (not shown) that can be disposed between the housing 302 and the back cover 312 to substantially define a barrier to the ingress of liquids or moisture into the internal volume 301 from the external environment at the location of the seal. As described herein, the seal can include polymer, metal, and/or ceramic materials. The similar seal can be substantially similar to, and can include, some or all of the features of the seal 326.

The electronic device 300 can also include internal components, such as a haptic engine 328, an electrical power supply 330 (e.g., a battery), a speaker module 336, and a logic board 332, also referred to as a main logic board 332 that can include a system in package (SiP) 334 disposed thereon, including one or more integrated circuits, such as processors 344, sensors, and memory. Specifically, the processors, sensors, and memory can be located within the internal volume 301 of the housing 302. The device 300 of FIG. 3 is shown in an exploded view and it is noted that the SiP 334 and speaker module 336 can be disposed in the internal volume 301 when the device 300 is assembled.

In some examples, internal components can be disposed below the main logic board 332 and can be disposed at least partially in a portion of the internal volume 301 defined by the back cover 312. In some examples, the electronic device 300 can include one or more wireless antennas (not shown) that can be in electrical communication with one or more other components of the electronic device 300. In some examples, the antenna(s) can receive and/or transmit wireless signals at one or more frequencies and can be, for example, one or more of a cellular antenna such as a long-term evolution (LTE) antenna, a Wi-Fi antenna, a Bluetooth antenna, a GPS antenna, a multi-frequency antenna, and the like. The antenna(s) can be communicatively coupled to one or more additional components of the electronic device 300.

The main logic board 332 can determine an environment external to the housing 302 of the electronic device 300. The environment (i.e., a type of environment) can be determined to be an atmospheric or arid environment, such as while a user of the electronic device 300 is lounging in a chair on a beach. Alternatively, the determined environment can be aqueous, for example, when the user enters a body of water such as an ocean, lake, or pool and the electronic device 300 is temporarily submerged under water. Additionally or alternatively, properties of the environment, such as altitude, pressure, or humidity of the environment can be determined. The main logic board 332 can determine the type of environment by any technology currently available or otherwise developed in the future. For example, the electronic device 300 can include one or more components that measure or detect characteristics of the environment based on location information (i.e., GPS data), pressure detection, spectroscopy, moisture detection, or a combination thereof.

In some examples, the electronic device 300 can include a speaker assembly 336 disposed within the internal volume 301 defined by the housing 302. The speaker assembly 336 can include one or more speakers that convert electrical signals into acoustic waves that are audible to humans at an environment external to the housing 302. For example, one or more apertures 338 can be formed within the housing 302, which place the speaker assembly in fluid communication with the environment external to the housing 302. The internal components can be disposed within the internal volume 301 defined at least partially by the housing 302, and can be affixed to the housing 302 via adhesives, internal surfaces, attachment features, threaded connectors, studs, posts, or other features, that are formed into, defined by, or otherwise part of the housing 302 and/or the back cover 312.

The electronic device 300 can include additional components, such as one or more sensors 340a-c, which can detect or measure an environmental parameter. In other words, parameters such as temperature, altitude, pressure, humidity, acceleration, gyration, or the like. For example, the one or more sensors can be a thermometer, a barometer, a humidity sensor, an accelerometer, a gyroscope, or the like. Additionally or alternatively, the sensors 340a-e can be or can include sensors to measure parameters associated with a user of the electronic device. For example, the sensors 340a-e can be a pulse oximeter, a heart rate monitor, a blood oxygen saturation monitor, a thermometer, or the like. In some examples, such as shown in FIG. 3, the one or more sensors 340a-e can be positioned on or adjacent one or more of the components of the electronic device 300. In other words, each of the one or more sensors 340a-e can be affixed, adhered, fastened, or otherwise coupled to a component of the electronic device 300.

The sensors 340a-e can provide situational data to and/or about the user of the electronic device. For example, information relating to temperature, altitude, pressure, or humidity can provide indication as to a terrain in which the user is situated, such as an urban, mountainous, desert, coastal environment, or the like. Acceleration or gyration information can provide indication to an immediate change of state of the user, such as a fall or a collision. Pulse, oxygen, heart rate, and temperature of the user can provide indication of a current health state of the user, such as consciousness, access to oxygen, or the like.

The electronic device 300 can be configured to generate a modulated acoustic signal via the speaker module or speaker assembly 336. The modulated acoustic signal can include a first component, such as a siren that is audible to humans, and a second component that includes the data inaudible to humans. The data can be situational data, which relates to a present state of a user of the electronic device. The situational data can include one or more of an indication of information that the user is in an emergency or is in distress, the nature of the distress, medical identification of the user, a location of the user, GPS information, a time associated with the distress, or similar information. In particular, the situational data can provide information on any suitable information relating to the user of the electronic device 300. The first component and the second component can include a first audio wave and a second audio wave, respectively, which are output by the speaker modulate or speaker assembly 336.

In some examples, the first component of the modulated acoustic signal can include an acoustic wave, with an analog waveform, while the second component of the modulated acoustic signal is a binary or digital signal with a digital waveform, which can include only values from a set of distinct values. In other examples, the second component can also be an analog signal with an analog waveform, which include arbitrary values within a range of the analog waveform. The second component can be superimposed with the first component in order to generate the modulated acoustic signal and encode the situational data. The modulated acoustic signal can be frequency modulated, amplitude modulated, or be a keying, such as phase-shifted keying, frequency-shifted keying, amplitude-shifted keying, or other suitable modulation techniques.

The display assembly 304 of the electronic device can receive user input that includes the situational data. For example, the display assembly 304 can allow the user to input information including the situational data into the electronic device 300, and the electronic device 300 can generate the modulated acoustic signal based on the information input by the user. Furthermore, the acoustic wave (siren) can be predetermined based on an external input from the user. Examples of external inputs can include the user interacting with the display assembly 304 to input distress information, such as being lost, having fallen, being injured, etc. via touch inputs, buttons, and/or a keyboard. Other examples of external inputs can include the user providing audio cues, such as verbal indications of distress, which can be received by the speaker module 336. Additionally or alternatively, audio cues may include sound recognition by the electronic device 300. In some examples, the electronic device 300 can be configured to recognize certain sounds of distress, such as a fall, a fire alarm, screaming, etc. Some properties of the acoustic wave (siren) that can be predetermined can include, but are in no way limited to, frequency, amplitude, repetition (e.g., intervals of on/off), etc., and such properties may be determined by, or correspond to, the nature of the distress.

Additionally, the microphone 342a of the electronic device 300, can be configured to receive the modulated acoustic signal. The processor located in the internal volume of the housing 302 can be electrically coupled to the microphone 342a and can identify the first component of a received modulated acoustic signal (e.g., from a different electronic device), and can extract the second component of the received modulated acoustic signal. Furthermore, the electronic device 300 can determine, based on the second component, encoded information of the received modulated acoustic signal. The encoded information can include the situational data. The additional microphones 342b-c can operate in a similar way to the microphone 342a, and receive the modulated acoustic signal. In some examples, the use of three microphones 342a-c can allow the electronic device 300 to operate in a high-gain receiving mode, which can allow for increased frequency range (e.g., of the first component) that can be received by the electronic device 300.

Any of the features, components, and/or parts, including the arrangements and configurations thereof shown in FIG. 3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3.

Figure 4A:
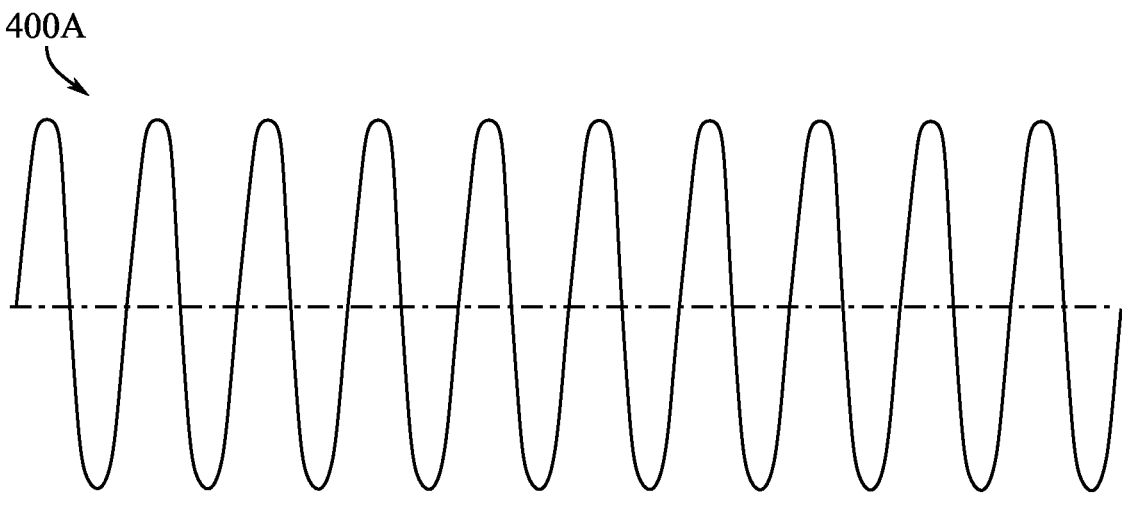
FIG. 4A illustrates an example acoustic waveform of a siren, according to one example.

FIG. 4A illustrates an example acoustic waveform 400A of a siren, according to one example. A smartwatch, wearable device, portable electronic device, or other electronic device can be configured to generate a siren. In the case that a user of the smartwatch is in distress, the siren can alert nearby people of the distress and/or the nature of the distress.

In some examples, the acoustic waveform 400A of a siren is a periodic acoustic wave with a constant frequency and amplitude and is audible to humans. In other words, the siren can be a prolonged sound that is output by the smartwatch as a signal or a warning. The acoustic waveform 400A can be an example of a first component of an acoustic signal generated and transmitted by the smartwatch. In particular, the first component is a first audio wave such as the siren. Although not depicted in FIG. 4A, in alternate examples, rather than having a constant frequency and amplitude, the acoustic waveform 400A can have a varying frequency or varying amplitude. For example, a varying frequency can cause a tone of the siren to increase/decrease over time, or the tone of the siren to be alternating among one or more different tones, etc. A varying amplitude can cause a volume of the siren to increase/decrease over time, or the volume of the siren can be alternating among one or more different volumes, etc. Examples of such sirens include emergency vehicles, fire alarms, and the like which can have varying tones and/or volumes by varying the frequencies and/or amplitudes of their acoustic waveforms. In general, an acoustic waveform such as described is an analog audio signal.

Figure 4B:
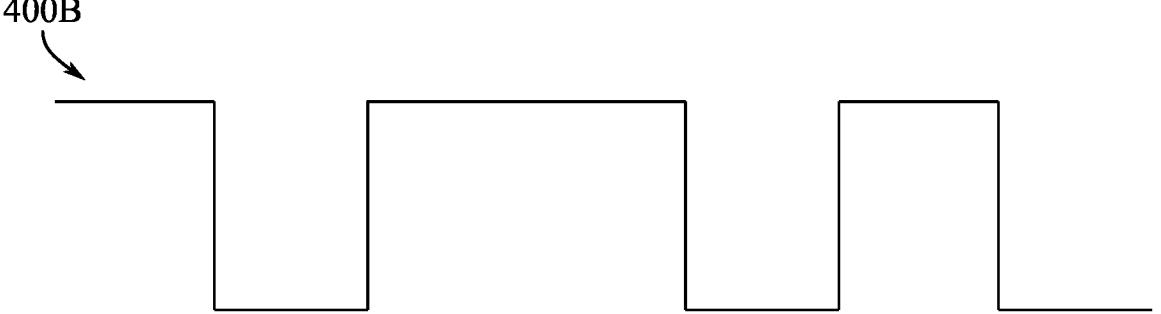
FIG. 4B illustrates an example data signal waveform, according to one example.

FIG. 4B illustrates an example data signal waveform 400B, according to one example. As depicted in FIG. 4B, the data signal waveform 400B is a binary data signal, which can include one of two distinct values allowing for transmission of information such as situational data. The acoustic data signal can be predetermined (e.g., its frequency and amplitude). The data can be representative of an audio wave encoded with specific situational data, such as information regarding a distress situation of a user of the smartwatch. Distressful situations can include one or more of a fall, injury, or disorientation of the user. In some cases, the user may be lost and need to be located. For example, users that are recreating outdoors (hiking, skiing, swimming, etc.), especially in mountainous or forested locations may become separated from their group. In some examples, rather than being a digital signal, the data signal waveform 400B can be an analog signal to modulate the acoustic waveform 400A. Although depicted in FIG. 4B as a binary signal, in other examples the data signal waveform can be more general digital signals, which can include one value out of a finite number of values at any given time. Alternatively, the data signal waveform can be an analog signal, such as a sine wave, a periodic triangular (sawtooth) wave, or the data signal waveform can be an arbitrary analog signal, which is not necessarily periodic.

Figure 4C:
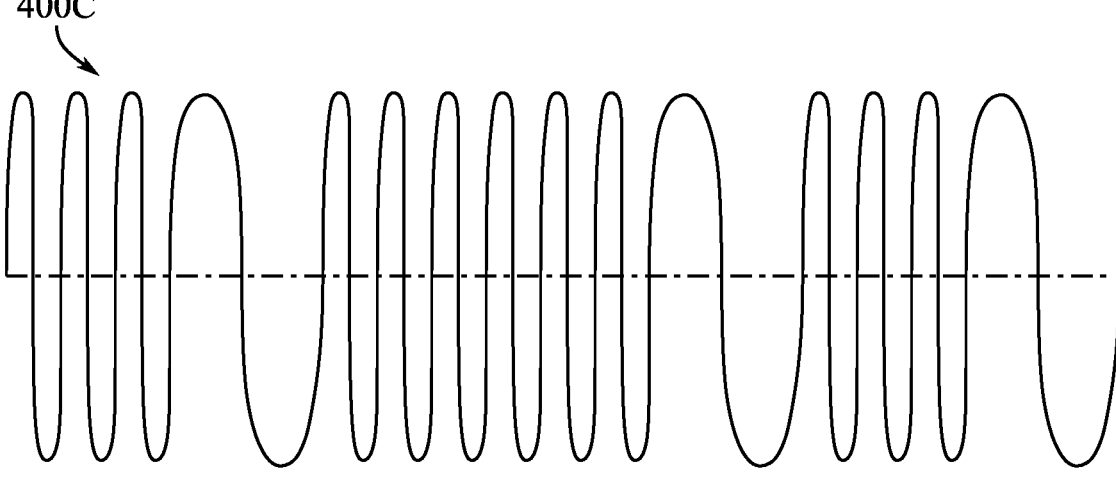
FIG. 4C illustrates an example modulated acoustic signal, according to one example.

FIG. 4C illustrates an example modulated acoustic signal 400C, according to one example. More specifically, the acoustic waveform 400A is a carrier signal and the data signal waveform 400B is a binary modulation signal that used to encode the situational data. One or more properties of the acoustic waveform 400A can be varied by the modulation signal which contains information to be transmitted. As depicted in FIG. 4C, the modulated acoustic signal 400C is frequency modulated, but in other examples, the modulated acoustic signal can be amplitude or phase modulated.

In some examples, the carrier signal has a greater frequency than the modulation signal, which facilitates transmission of more data over longer distances. The smartwatch can include a modulator to generate the modulated acoustic signal. The smartwatch can also include a demodulator to decode the modulated acoustic signal and extract the situational data.

Any of the features, components, and/or parts, including the arrangements and configurations thereof shown in FIGS. 4A-C can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 4A-C.

Figures 5, 6:
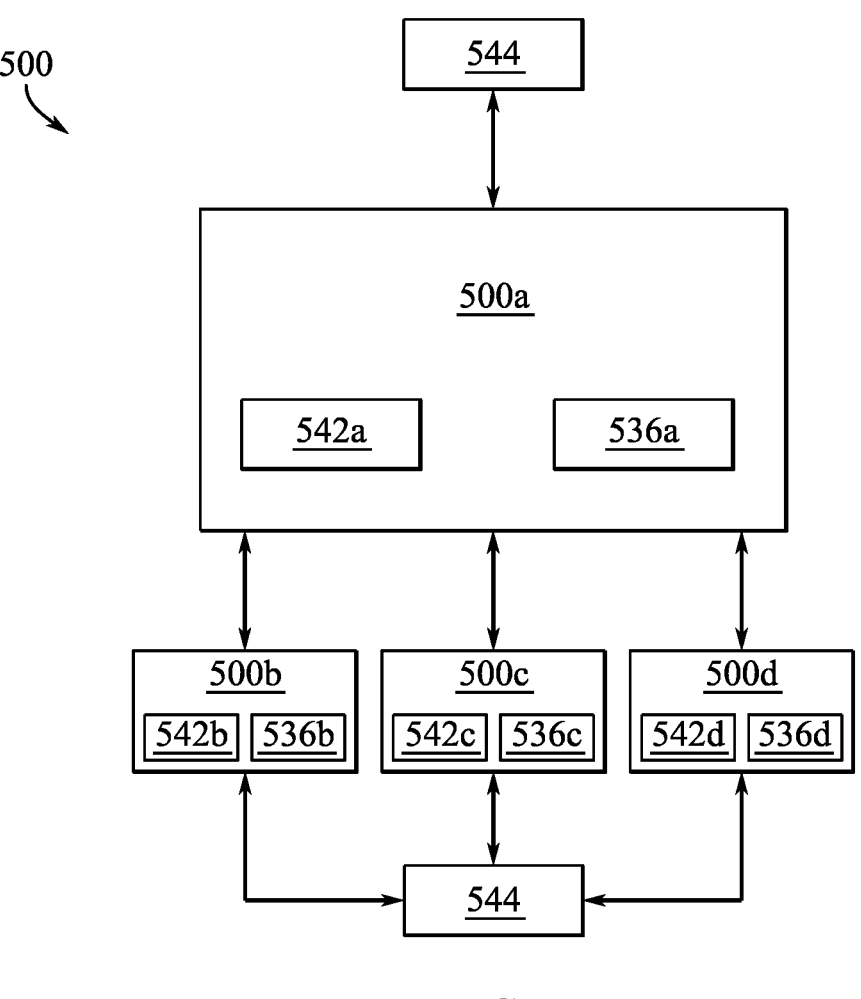
FIG. 5 illustrates a system including one transmitting (TX) device and a plurality of receiving (RX) devices, according to one example.
FIG. 6 illustrates a system including a TX device, an RX device, and a relay device, according to one example.

FIG. 5 illustrates a system 500 including one transmitting (TX) device 500a and a plurality of receiving (RX) devices 500b-d, according to one example. The TX device 500a can be an electronic device, such as the electronic devices 100, 200, or 300 of FIGS. 1-3. In some examples, the TX device 500a is a wearable device, such as a smart watch, that is capable of transmitting a modulated acoustic signal, such as the modulated acoustic signal 400C of FIG. 4C. The TX device 500a can include at least one microphone 542a and at least one speaker 536a. The speaker 536a can transmit the modulated acoustic signal 400C. It is worth noting that throughout the corresponding description, although for convenience the TX device 500a is described as transmitting the modulated acoustic signal 400C and at least one of the RX devices 500b-d are described as receiving the modulated acoustic signal 400C, the role of any one of the devices can be reversed. For example, any one of the RX devices 500b-d can generate and transmit its own modulated acoustic signal that can be received by the TX device 500a.

Each of the RX devices 500b-d can be any type of electronic device that is capable of receiving the acoustic signal. As depicted, the RX devices 500b-d are a smart watch 500b, a smart phone 500c, and a general electronic device 500d, respectively. However, each of the RX devices can be other types of devices. Examples of such devices can be wearable devices, smart watches, smart phones, laptops, smart speakers, or other electronic devices. Similar to the TX device 500a, the RX devices 500b-d can each include at least one microphone 542b-d and at least one speaker 536b-d. The microphones 542b-d can receive the modulated acoustic signal 400C. In some examples, the TX device 500a and the RX devices 500b-d are interchangeable, in such a way that one of the smart watch 500b, the smart phone 500c, or the general electronic device 500d are transmitters of the modulated acoustic signal 400C and the TX device 500a receives the modulated acoustic signal 400C.

In some examples, the microphones 542b-d of the RX devices 500b-d are actually each three or more microphones. The three or more microphones are inherently located at different positions within the RX devices 500b-d and can be used to improve accuracy in identifying a location of the TX device 500a. In one example, at least two of the three or more microphones within a single of the RX devices 500b-d can be used to triangulate the received modulated acoustic signal to determine the location of the TX device 500a. Additionally or alternatively, if more than one of the RX devices 500b-d is within range to receive the modulated acoustic signal 400C, triangulation can be performed between microphones of the different RX devices 500*b-d*. In another or further example, at least one of the three or more microphones can utilize the Doppler Effect when there is a relative change in the distance between the RX devices 500*b-d* and the TX device 500*a*. In another further example, relative loudness (based on changing distances), Bluetooth signal strength, ultra wideband radio frequency (RF) signal strength, and or GPS broadcasts, etc. can be utilized.

In some examples, having three or more microphones can allow the RX devices 500*b-d* to operate in a high-gain RX mode, especially if the TX device 500*a* uses high-frequency sires to transmit the modulated acoustic signal. In some examples, humans can still hear a tone associated with the modulated acoustic signal, but the TX device 500*a* can identify the data encoded in the modulated acoustic signal. In particular examples where the user of the TX device is lost in a mountainous, forested, underwater, or dense urban environment and is distressed, a search party can act faster to find the distressed user.

The TX device 500*a* and/or the RX devices 500*b-d* can be in wireless communication with a GPS 544. The GPS 544 can provide geolocation and time information to the TX device 500*a* and/or the RX devices 500*b-d*. Geolocation and time information can then be communicated via the modulated acoustic signal between the TX device 500*a* and the RX devices 500*b-d*. In some examples, the TX device 500*a* can encode the geolocation information in the modulated acoustic signal that is transmitted, and the RX devices 500*b-d* can use the geolocation information to locate the TX device 500*a* that is transmitting the modulated acoustic signal. More specifically, the TX device can transmit a first audio wave that can be a siren and simultaneously transmit a second audio wave that includes the geolocation and time information from the GPS 544. Additionally or alternatively, the TX device 500*a* can encode first time information in the modulated acoustic signal. The RX devices 500*b-d* can compare second time information received from the GPS to the first time information, and a processor of the TX device 500*a* extract location information of the TX device 500*a*. The RX devices 500*b-d* can also use the comparison of the first and second time information to determine their relative velocity to the TX device 500*a*.

Any of the features, components, and/or parts, including the arrangements and configurations thereof shown in FIG. 5 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 5.

FIG. 6 illustrates a system 600 including a TX device 600*a*, an RX device 600*b*, and a relay device 600*c*, according to one example. In some examples, the TX device 100*a* may need to transmit an audio signal containing data to the RX device 600*b*, but the RX device 600*b* may be out of range of the TX device 600*a* to receive the audio signal. However, a relay device 600*c* may be within range of the TX device 600*a* and the RX device 600*b*, and can receive the audio signal containing the data from the TX device 600*a* and subsequently transmit the audio signal containing the data to the RX device 600*b*. This technique allows for transmission of the audio signal containing the data from the TX device 600*a* to the RX device 600*b* over longer ranges. To further increase the range, there can be more than one relay devices, similar to the relay device 600*c*, and the transmission of the audio signal containing the data can be chained from the TX device 600*a* to the one or more relay devices and subsequently to the RX device 600*b*.

In some examples, there may be a need for the RX device 600*b* to return a responsive audio signal containing second data to the TX device 600*a*. For example, the RX device 600*b* can confirm that it has received the original audio signal containing the data. Additionally or alternatively, the RX device 600*b* can communicate a specific response, such as sending medical help, locating the TX device 600*a*, etc. Communication of the responsive audio signal from the RX device 600*b* to the TX device 600*a* can also rely on the relay device 600*c* if the RX device 600*b* and the TX device 600*a* are out of range. The relay device 600*c* can receive the responsive audio signal from the RX device 600*b* and relay the responsive audio signal to the TX device 600*b*. In some examples, similar to as described above, there can be more than one relay device, similar to the relay device 600*c*.

In some examples, there can be one or more relay devices in a vicinity of both or either of the TX device 600*a* and the RX device 600*b*. In these cases, the audio signal containing the data can be transmitted from the TX device 600*a* to the RX device 600*b* (or from the RX device 600*b* to the TX device 600*a*) using a most efficient path, similar to mesh network for wireless communication.

Any of the features, components, and/or parts, including the arrangements and configurations thereof shown in FIG. 6 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 6.

Figure 7:
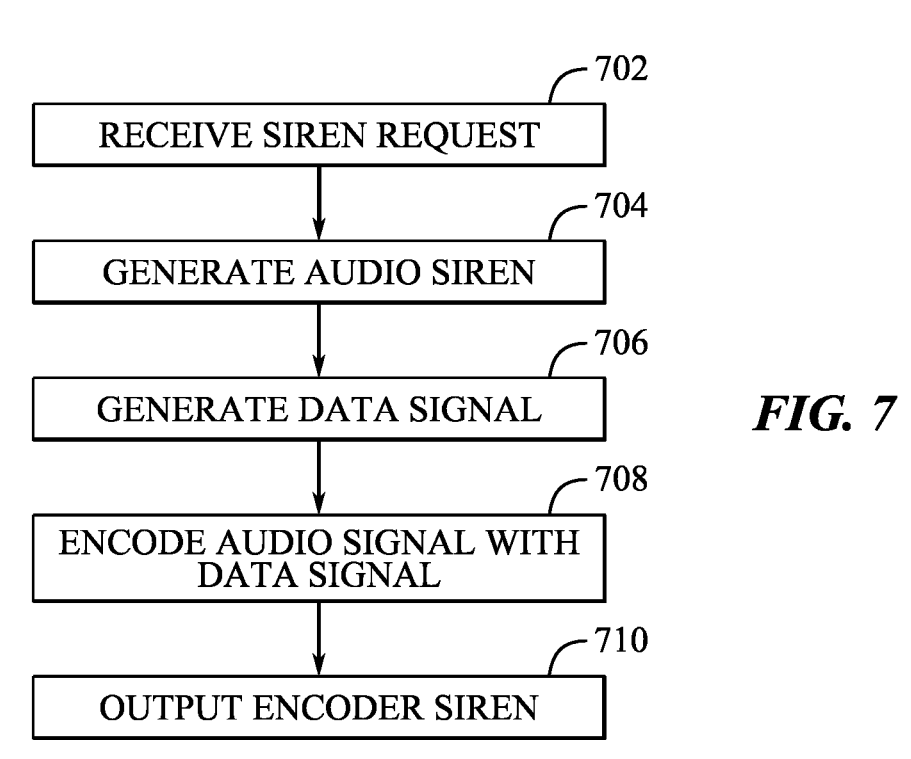
FIG. 7 is a method flow chart of a generation of an audio signal with data by a wearable device, according to one example.

FIG. 7 is a method flow chart 700 of a generation of an audio signal with data by a wearable device, according to one example. Although described below as a wearable device, a similarly appropriate device can be any electronic device such as a smartwatch, smartphone, laptop, smart speaker, or the like capable of transmitting the audio signal. The wearable device includes a processor. The processor can receive a request, for example, automatically by the wearable device or manually from a user of the wearable device (block 702). The request can be a request to generate an acoustic signal, such as a siren (block 704). The siren can be a first audio wave that is audible to humans.

As part of the request, the processor can additionally generate a data signal (block 706). In some examples, the data signal can be a second audio wave. In other examples, the data signal can be a digital signal (binary or otherwise) or other type of signal to modulate the first audio wave. The processor can encode the audio signal with the data signal to generate a modulated acoustic signal which includes the first audio wave and the data signal or the second audio wave (block 708). The wearable device can also include a speaker that is configured to output the encoded modulate acoustic wave (e.g., the encoded siren in which the first audio wave is encoded with the data signal) (block 710).

Any of the features, components, and/or parts, including the arrangements and configurations thereof shown in FIG. 7 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 7.

Figure 8:
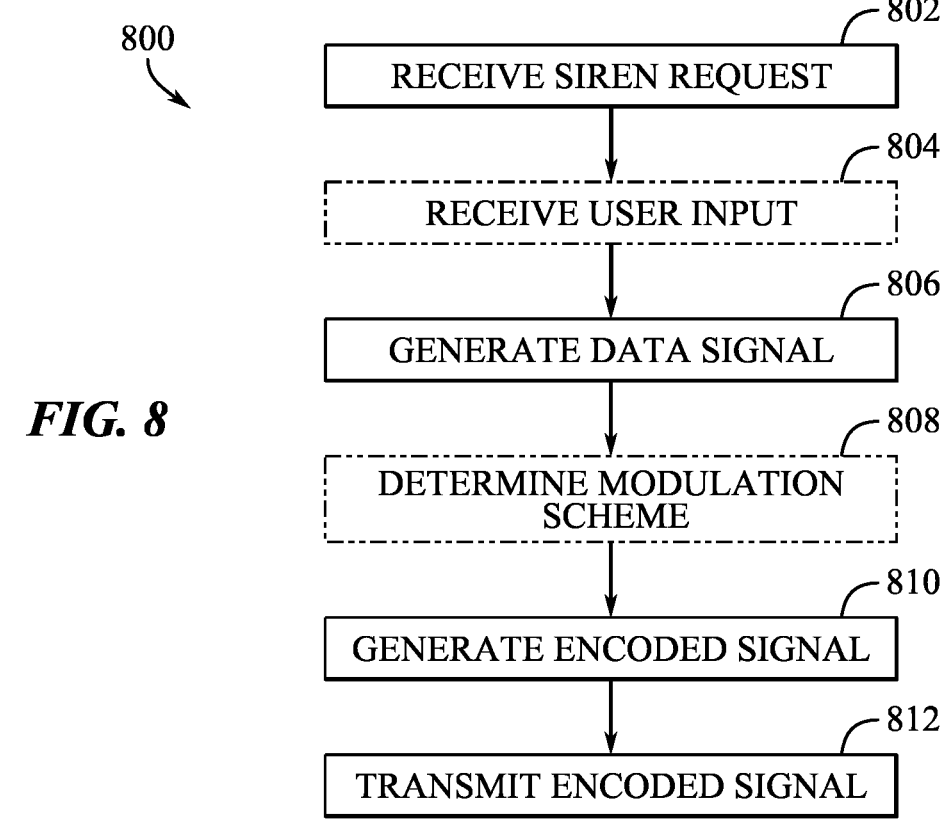
FIG. 8 is a method flow chart of transmission of an encoded audio signal by a wearable device, according to one example.

FIG. 8 is a method flow chart 800 of transmission of an encoded audio signal by a wearable device, according to one example. The wearable device can receive a request for a siren (block 802). The request can be based on user distress, and can be generated automatically (e.g., based on accelerometer or gyroscopic information when a user falls, pulse or blood oxygen monitors, or the like), or manually as an input (a user can provide an indication of being lost in a mountainous or forested region, of a fall, or of other distress) (block 804). Based on the nature of the distress, the processor of the wearable device can generate a data signal (block 806). The data signal can be a data signal for digital modulation, or it can be an audio signal independent of the siren. The nature of the distress can include a user indicating to "navigate to my current location," "call emergency services," etc.

The processor can determine a modulation scheme to modulate the siren to encode the data signal into the siren (block 808). For example, the modulation scheme can be amplitude modulated, frequency modulated, phase modulated or the like. In some examples, the processor can determine the modulation scheme based on the nature of the emergency. For example, the siren can be amplitude modulated when the user is known to be, or likely far from an RX device, while the siren can be frequency modulated when specific details of the nature of the distress can be beneficial.

Once the data and the modulation scheme are determined, the process can generate an encode signal which includes the siren and data relating to the distress (block 810), and can then transmit the encoded signal (block 812). In some examples, the processor of the wearable device can determine to send the encoded signal to a specific RX device. In other examples, the processor of the wearable device can broadcast the encoded signal, and any RX device within range can receive the encoded signal and respond appropriately.

Appropriate responses by an RX device can relate to the nature of the distress as indicated by the encoded signal. In one example, a direction from which the encoded signal is received as an audio tone can be difficult to echo locate in some environments. In particular, mountainous or forested areas can create multiple paths for a distress signal, which can obscure its origin. Furthermore, certain weather conditions, such as rain, snow, wind, etc. can obscure the location, especially from humans (users of an RX device). As such, encoded signals, such as audio signals encoded with data, can provide RX devices, and thus their users, with distress information of a distressed individual with a suitable wearable device.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data can be used to provide insights into a user's general wellness, or can be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data can be governed by federal and/or state laws, such as the Health Insurance Portability and Accountability Act (HIPAA); whereas health data in other countries can be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user can be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A wearable device, comprising:
a housing defining an internal volume and an aperture;
a speaker disposed within the internal volume and in fluid communication with an environment external to the housing via the aperture;
a microphone disposed within the internal volume and in fluid communication with an environment external to the housing via the aperture; and
a processor disposed within the internal volume and connected to the speaker and the microphone, the processor configured to:
decode an audible acoustic signal received by the microphone, the audible acoustic signal comprising a first audio waveform and a second audio waveform, the second audio waveform comprising a digital signal;
generate an audible modulated acoustic signal; and
output the audible modulated acoustic signal via the speaker.

2. The wearable device of claim 1, wherein:
the wearable device is a smart watch; and
the second audio waveform comprises situational data.

3. The wearable device of claim 2, wherein the situational data comprises a binary data signal.

4. The wearable device of claim 1, further comprising a display assembly connected to the housing, the display assembly including a touch sensitive layer to receive user input comprising the situational data.

5. The wearable device of claim 1, wherein the first audio waveform comprises a siren.

6. The wearable device of claim 1, wherein:
The audible modulated acoustic signal comprises a first modulated acoustic signal; and
the wearable device further comprises a plurality of microphones including the microphone disposed within the internal volume.

7. The wearable device of claim 6, wherein the processor is configured to extract situational data from the audible modulated acoustic signal.

8. A wearable electronic audio device, comprising:
a housing defining an internal volume and an aperture;
a processor disposed within the internal volume, the processor configured to generate a modulated acoustic signal comprising a digital data waveform and an analog waveform; and
a speaker disposed within the internal volume, the speaker in fluid communication with an environment external to the housing via the aperture, and electrically coupled to the processor, the speaker configured to output the modulated acoustic signal.

9. The wearable electronic audio device of claim 8, wherein the processor is further configured to generate the modulated acoustic signal by superimposing the digital data waveform and the analog waveform.

10. The wearable electronic audio device of claim 9, wherein the modulated acoustic signal comprises one of a frequency modulation, an amplitude modulation, a phase modulation, or a frequency-shift keying.

11. The wearable electronic audio device of claim 8, wherein the processor generates the signal in response to a user input.

12. The wearable electronic audio device of claim 8, wherein the signal is predetermined in response to an external input.

13. The wearable electronic audio device of claim 8, further comprising a sensor electrically coupled to the processor, wherein the sensor measures an environmental parameter of the electronic audio device.

14. The wearable electronic audio device of claim 13, wherein the signal is based on the environmental parameter.

15. An electronic watch, comprising:
a microphone configured to receive an acoustic signal;
a processor electrically coupled to the microphone, the processor configured to:
identify a first component of the acoustic signal;
extract a second component of the acoustic signal;
generate a modulated acoustic signal via the first component of the acoustic signal and the second component of the acoustic signal; and
determine, based on the second component, encoded information.

16. The electronic watch of claim 15, wherein the first component of the acoustic signal comprises a predetermined siren signal.

17. The electronic watch of claim 15, wherein the second component of the acoustic signal comprises global positioning system (GPS) information.

18. The electronic watch of claim 15, wherein the microphone is a first microphone, the electronic device further comprising a second microphone.

19. The electronic watch of claim 18, further comprising a third microphone.

20. The electronic watch of claim 15, wherein:
the first component of the acoustic signal comprises an
   acoustic wave; and
the second component of the acoustic signal comprises a
   binary signal.

\* \* \* \* \*